A. J. MEYER.
CONVEYER.
APPLICATION FILED APR. 28, 1908.
919,615.   Patented Apr. 27, 1909.
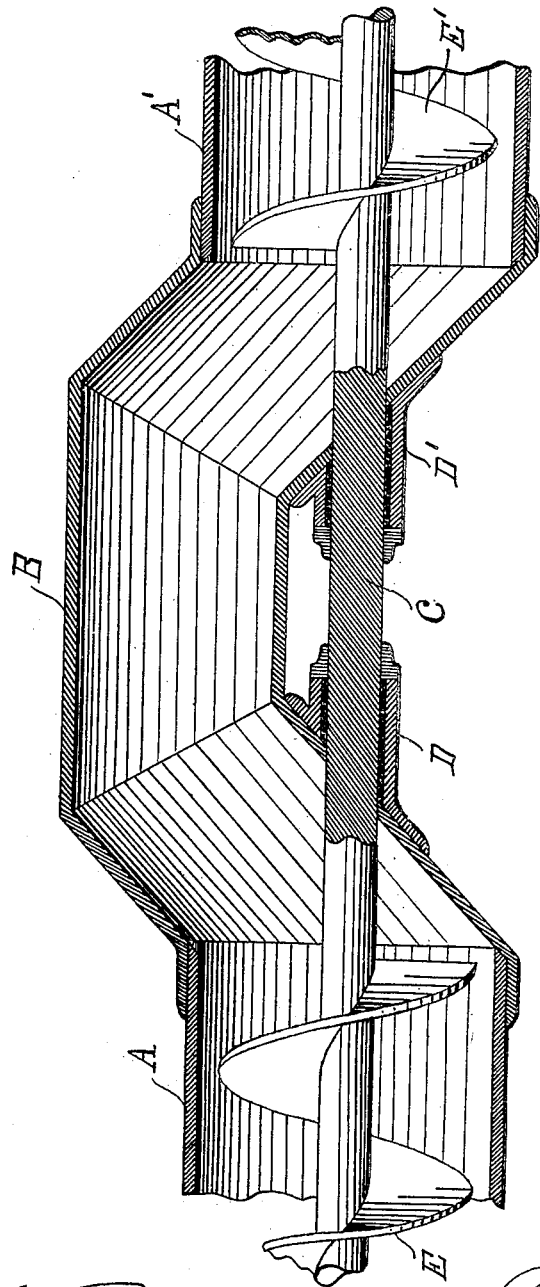

UNITED STATES PATENT OFFICE.

ALBERT J. MEYER, OF NAZARETH, PENNSYLVANIA.

CONVEYER.

No. 919,615.     Specification of Letters Patent.     Patented April 27, 1909.

Application filed April 28, 1908. Serial No. 429,589.

*To all whom it may concern:*

Be it known that I, ALBERT J. MEYER, a citizen of the United States, residing at Nazareth, in the county of Northampton and State of Pennsylvania, have invented a new and useful Improvement in Conveyers, of which the following is a specification.

My invention relates to conveyers of the class wherein the material is carried through a worm-casing by means of a worm rotating therein, and my object is to provide an improved means for supporting the worm shaft in conveyers of this class.

In relatively short conveyers of this type, the shaft bearings at either end of the worm casing are ordinarily sufficient to adequately support the shaft and worm. But it frequently happens that a conveyer of considerable length is required and when this is the case the worm shaft has to be provided with some form of support at points intermediate between the bearings at either end of the worm casing. The support now in use for this purpose consists of one or more hangers or brackets secured to the casing at suitable intervals and provided with bearings for the shaft. The practical objections to this method of intermediate support for the shaft and worm are, first, that the hanger or bracket so located interferes to some extent with the passage of material through the conveyer; secondly, that the shaft-bearing in the hanger is more or less exposed to wear in consequence of the material conveyed working into the bearing, with resultant injury both to the bearing and to the shaft at such points, and lastly, the hanger or bracket itself is cut or worn away with more or less rapidity according to the character of the material that is being passed through the conveyer.

To obviate the foregoing defects in the existing method of supporting the worm-shaft, I have provided a shaft supporting means located entirely outside of the worm-casing, as hereinafter described and shown in the accompanying drawing, in which,—

Figure 1 is a view, in longitudinal section, of my improved supporting means.

In Fig. 1 A. $A^1$ represent two adjoining lengths of worm-casing, connected by the elbow-section. B. The latter may be of the form shown in the drawing or may be curved or semi-circular in shape. In either case, the object of the elbow-section B is to enable the worm-shaft C to pass, for a short portion of its length, entirely outside of the casing wherein the material is being conveyed. The shaft support at this point consists of the bearings D. $D^1$ which are located on the outside of the casing and which are provided with suitable packing glands of ordinary form; thus effectually excluding from said bearings any particles of the material passing through the casing. The worm E. $E^1$ is discontinued at the elbow section, the material being readily pushed by the action of section E of the worm around the elbow-section B to a point where it is again taken up and carried forward by the following worm section $E^1$. By thus providing shaft-bearings entirely outside the worm casing I secure a better and firmer bearing to preserve the proper alinement of the worm and worm shaft, in addition to obviating by this arrangement of parts the disadvantages hereinabove set forth, attendant upon the existing method of supporting the shaft by bearings located within the worm-casing.

Having thus described my improved idea of means, what I claim as my invention and desire to secure by Letters Patent is—

1. In combination in a conveyer, a worm casing consisting of two straight lengths having a common axis and joined by a connecting section so formed that the common axis of said straight lengths is partially external to said connecting section, and a worm-shaft supported externally to said connecting section and carrying a worm in each of said straight lengths, substantially as described.

2. In combination in a conveyer, a casing formed in two lengths having a common axis, a worm shaft continuous throughout both lengths of said casing and carrying a worm in each length thereof, a connecting section for said casing lengths, and bearings for said worm shaft external to said connecting section, substantially as described.

3. In combination, a worm casing having two straight lengths with a connecting section therefor, the common axis of said straight lengths being partially external to said connecting section, a worm-shaft common to both of said straight lengths and supported by a bearing external to said connecting section and carrying a worm in each of said straight lengths, substantially as described.

4. In combination, a worm casing consisting of two straight lengths having a common axis and a connecting elbow, a worm-shaft common to both straight lengths and supported by a bearing external to said connecting elbow, and a worm in each straight length actuated by said worm-shaft, substantially as described.

ALBERT J. MEYER.

Witnesses:
GEO. S. EMERICK,
CHRIS. E. STIVER.